United States Patent [19]

Patton

[11] 4,012,058

[45] Mar. 15, 1977

[54] MAGNETIC COUPLER FOR ENGINE EXHAUST DUCTS

[76] Inventor: James E. Patton, R.R. No. 3, 1950 Beery Road, Elida, Ohio 45807

[22] Filed: Feb. 17, 1976

[21] Appl. No.: 658,411

[52] U.S. Cl. .......................... 285/9 M; 248/206 A
[51] Int. Cl.² ..................................... F16L 25/00
[58] Field of Search ........... 285/9 M, 9 R; 206/818; 64/28 M; 248/206 A; 220/230; 98/115 R, 115 LH; 24/201 B, 73 MS

[56] References Cited

UNITED STATES PATENTS

| | | | |
|---|---|---|---|
| 1,780,693 | 11/1930 | Yazel | 285/9 R |
| 2,793,057 | 5/1957 | McGugin | 285/9 M |
| 3,321,170 | 5/1967 | Vye | 248/206 A |

*Primary Examiner*—Wayne L. Shedd
*Attorney, Agent, or Firm*—Malcolm W. Fraser

[57] ABSTRACT

A coupler for connecting a hose to an engine exhaust duct for conveying products of combustion to the outside of an enclosed area. Permanent magnets enable mounting of the coupler to be quickly made. A handle spaced from the coupler bracket enables the magnetic attraction between the coupler and the engine block to be broken without touching the hot metal. A spring tensioned gas tube is urged into engagement with the engine exhaust duct when the coupler is in operative position.

4 Claims, 2 Drawing Figures

MAGNETIC COUPLER FOR ENGINE EXHAUST DUCTS

BACKGROUND OF THE INVENTION AND SUMMARY

After internal combustion engines are made, they are tested in an enclosed area from which it is necessary to convey the products of combustion and noxious gases to the outside. It is desired to connect and disconnect the exhaust hose for this purpose quickly. Since the engine blocks become intensely hot, disconnection of the hose is a problem.

To cope with this situation, the bracket for the coupler has permanent magnets so that the magnetic flux between the magnetized coupler bracket and the magnetically attractable engine block causes the coupler instantly to be held to the block without further manipulation by the workman.

Carried by the bracket is a spring tensioned exhaust pipe which snaps into the engine exhaust duct to convey the gases therefrom to the hose carried by the exhaust pipe. A remotely engageable handle is grasped to tilt the coupler bracket to break the connection with the engine block, the same being relatively cool so as to be conveniently manipulated.

PREFERRED EMBODIMENT OF THE INVENTION

Figure 1:
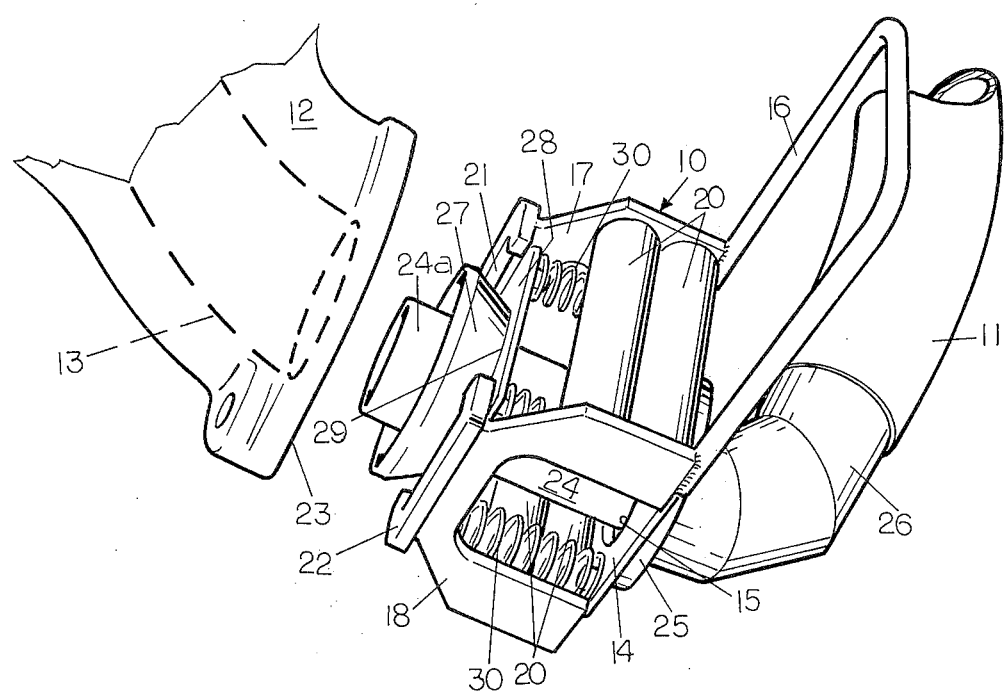
FIG. 1 is a perspective view of the magnetic coupler shown adjacent to but separated from a fragment of an internal combustion engine block.
Figure 2:
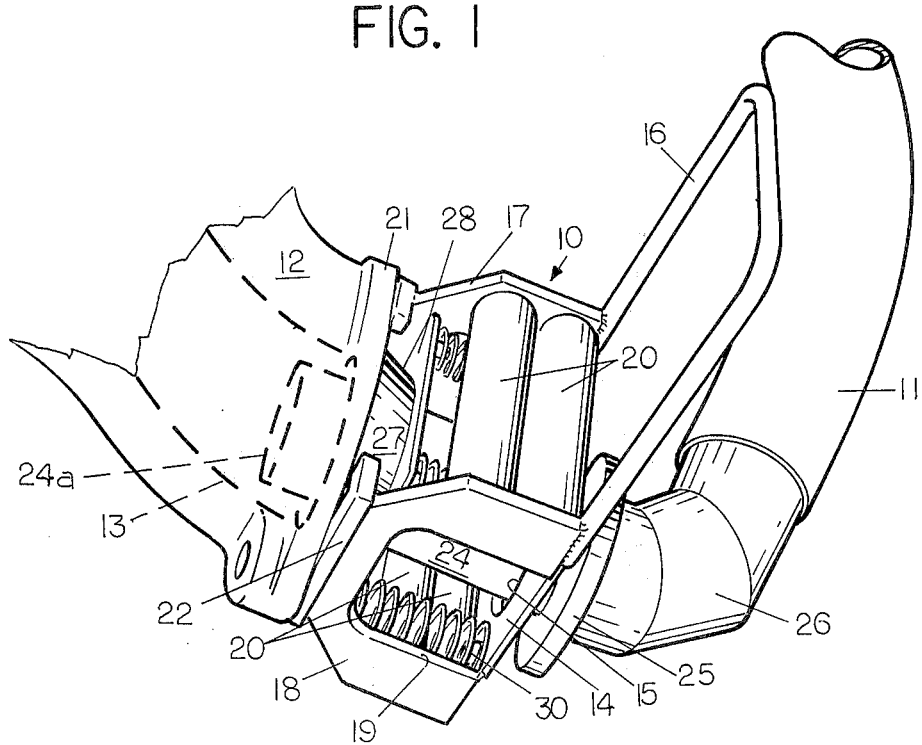
FIG. 2 is a view similar to FIG. 1, but showing the coupler in engagement with the engine block.

The illustrated embodiment of the invention comprises a coupler indicated generally at 10, which is equipped with a detachable flexible hose 11 leading to the outside of the room or enclosure in which internal combustion engines are being tested. In the drawing, 12 generally indicates an internal combustion engine block of ferrous or other magnetizable metal, which has an exhaust duct 13 from which the hot products of combustion, including monoxide gas, passes. The coupler 10 also is of magnetizable metal, at least so far as that portion is concerned, which abuts against the engine block 12. As a consequence, all that needs to be done is to place the coupler 10 against the engine block. Due to the influence of the magnetic flux passing between the magnets carried by the coupler and the magnetically attractable engine block, the parts are securely held in engagement with each other so that the products of combustion from the engine being tested pass through the magnetized coupler from which they are conducted to the outside of the room or building in which testing is carried on.

The coupler 10 comprises a supporting bracket, preferably of ferrous metal provided with a backing or cross plate 14, which is formed with a central circular aperture 15. Welded to the coupler, and preferably to the supporting bracket, is a metallic U-shaped handle 16 which extends a substantial distance laterally of the coupler so that it can be engaged readily even though the coupler is extremely hot due to the heat of the engine block 12. By extending the handle 16 laterally, the magnetic attraction between the coupler and the engine block can be easily broken by merely tilting the coupler relative to the engine block. Thereupon, the coupling can be moved almost instantaneously away from the engine block.

The supporting bracket also includes a pair of end plates 17 and 18 of magnetizable metal, and these are welded to opposite sides of the backing plate 14. They are somewhat thicker than the backing plate 14 and are formed with cut outs 19 to reduce weight. Two pairs of permanent magnets 20 are rigidly secured between the end plates 17 and 18 at opposite sides thereof as shown on the drawing. These are secured, as by welding, to the end plates, and, although four permanent magnetics are shown, the number can be changed as desired.

Fixed to the forward edges of the plates 17 and 18, and disposed at right angles thereto, are relatively narrow inwardly extending flat metallic abutment surfaces 21 and 22 for flat abutment with a flat surface 23 of the engine block.

For conducting the products of combustion from the engine exhaust duct 13, a metallic gas tube 24 extends freely through the hole 15 in the backing plate 14. Integral with the gas tube and disposed on the outer side of the cross plate 14 is a circular collar 25 which serves as a stop to limit the movement of the gas tube in the direction toward the engine block. At the outer end of the gas tube is an elbow 26 to which the flexible hose 11 is suitably attached. It will be understood that the hose 11 extends to the outside of the room or enclosure in which the engines are being tested, so that the products of combustion will not contaminate the air within the enclosure.

Adjacent the free end of the gas tube 24, or that end which extends into the engine exhaust duct 13, is a forwardly extending outwardly flared metal skirt 27, which is rigid with the tube. This leaves a forwardly projecting portion 24a of the gas tube which extends beyond the skirt 27 to extend well into the engine exhaust duct 13. Directly in rear of the skirt 27 is an abutment plate 28 which has a central hole 29 through which the gas tube is freely moveable. The plate 28 can abut against the inner face of the abutment surfaces 21 and 22. For urging the plate 28 toward the abutment surfaces 21 and 22, four helically coiled springs 30 bear respectively against the backing plate 14 and the abutment plate 28 and are disposed in equaspaced relation.

In practice, all that is necessary is to position the coupler 10 in front of the engine block 12 in position so that the gas tube extension 24a enters the exhaust duct 13. Thereupon the coupler is magnetically attracted to and maintained in place against the surface 23 of the engine block. This can be accomplished quickly and without particular effort. After completion of the testing of the engine, the coupler is removed readily by grasping the handle 16 and tilting the coupler sufficiently to break the magnetic hold of the magnetics to the engine block.

While I have illustrated and described the preferred form of construction for carrying my invention into effect, changes may be made in choices of material and details of construction and other modifications as come within the scope of the appended claims.

What I claim is:

1. A coupler for an exhaust duct of an engine block of magnetically attractable metal comprising a generally U-shaped bracket of magnetizable metal adapted to be placed in contact with the magnetic engine block, permanent magnets carried by said bracket and so arranged as to magnetize the bracket sufficiently that it will engage and hold itself to said exhaust duct, a spring tensioned gas tube carried by and having limited movement within said bracket and adapted to be spring urged to align with the engine exhaust duct for conducting the products of combustion therefrom, and collars on said tube spaced from each other for limiting gas tube movement in opposite directions, one collar engagable with said bracket, and an apertured plate through which said tube slides for engagement by the other collar.

2. A coupler according to claim 1, comprising an apertured plate within said bracket and spaced from said first plate, means on said tube engagable with said last plate for resisting gas tube movement in the opposite direction, and spring means between said plates for yieldably urging said first limiting means against its respective plate.

3. A coupler according to claim 1, comprising an apertured plate within said bracket and spaced from said first plate, a skirt on said tube engagable with said last plate for resisting gas tube movement in the opposite direction, and spring means between said plates for yieldably urging said first limiting means against its respective plate.

4. A coupler according to claim 1, comprising an apertured plate within said bracket and spaced from said first plate, a skirt on said tube engagable with said last plate for resisting gas tube movement in the opposite direction, spring means between said plates for yieldably urging said first limiting means against its respective plate, and a U-shaped metallic handle fixed to said bracket and extending therefrom for convenient manipulation of the adaptor relative to the engine block.

* * * * *